United States Patent
Rovati (10) Patent No.: US 6,182,192 B1
(45) Date of Patent: Jan. 30, 2001

(54) MEMORY INTERFACE DEVICE AND METHOD FOR ACCESSING MEMORIES

(75) Inventor: Fabrizio Rovati, Cinisello Balsamo (IT)

(73) Assignee: STMicroelectronics Limited, Bristol (GB)

( * ) Notice: Under 35 U.S.C. 154(b), the term of this patent shall be extended for 0 days.

(21) Appl. No.: 09/481,096

(22) Filed: Jan. 11, 2000

(30) Foreign Application Priority Data

Jan. 11, 1999 (GB) .................................................. 9900521

(51) Int. Cl.[7] .................................................. G06F 12/00
(52) U.S. Cl. ............................... 711/111; 711/5; 365/191
(58) Field of Search ......................... 711/111, 5; 365/191, 365/230.03, 239, 233.5

(56) References Cited

U.S. PATENT DOCUMENTS

| | | | |
|---|---|---|---|
| 4,924,375 | 5/1990 | Fung et al. | 364/200 |
| 5,022,004 | 6/1991 | Kurtze et al. | 365/189.07 |
| 5,487,049 | * 1/1996 | Hang | 365/221 |
| 5,502,835 | 3/1996 | Le et al. | 395/496 |
| 5,587,953 | * 12/1996 | Chung | 365/220 |
| 5,590,304 | 12/1996 | Adkisson | 395/427 |
| 5,615,355 | 3/1997 | Wagner | 395/494 |
| 5,659,687 | 8/1997 | Kim et al. | 395/292 |
| 5,765,182 | 6/1998 | Lau et al. | 711/5 |
| 5,950,229 | 9/1999 | Jeddeloh | 711/150 |

FOREIGN PATENT DOCUMENTS 0 733 980 A1  9/1996  (EP) .
WO 96/30838  10/1996  (WO) .

* cited by examiner

Primary Examiner—David Nelms
Assistant Examiner—Connie C. Yoha
(74) Attorney, Agent, or Firm—Theodore E. Galanthay; Robert Iannucci; Seed IP Law Group PLLC (57) ABSTRACT

A memory interface is disclosed for accessing a plurality in memory regions. The interface includes a register which stores a number of memory request signals received from a processor or the like. The memory interface includes circuitry for detecting which memory region each memory request refers to and also which page within that memory region is required to be accessed. Using the information contained in the register, the memory interface is able to determine which page within a memory region will be required to be accessed after the currently open page is closed. The memory interface can detect this information a number of memory requests in advance. Thus the memory interface is able to provide the necessary control instructions to initiate the opening of the subsequently required page within a memory region so that when the memory request requiring access to this page is serviced, there is no delay in opening the page. The memory interface is arranged so that a page within a first memory region can be opened while a page within a second memory is being actually accessed.

22 Claims, 7 Drawing Sheets

MEMORY INTERFACE DEVICE AND METHOD FOR ACCESSING MEMORIES

FIELD OF THE INVENTION

The present invention relates to a memory interface device and a method for accessing memories and, in particular, for memories comprising a plurality of memory regions.

BACKGROUND OF THE INVENTION

Figure 1:
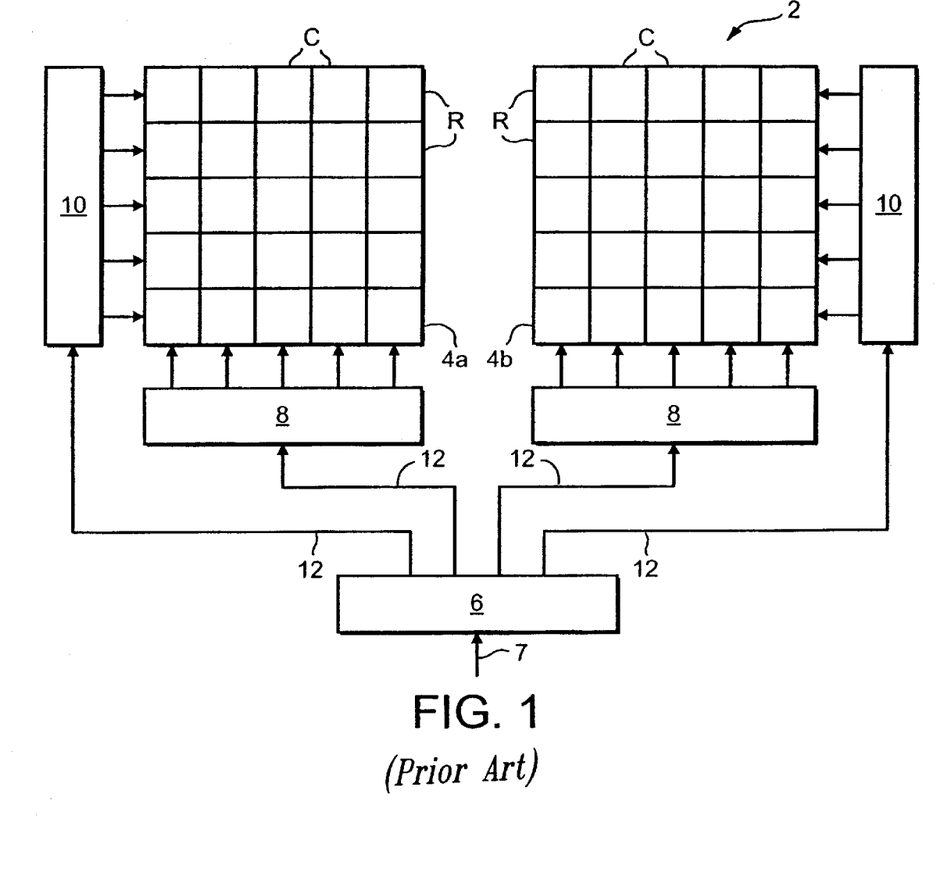
FIG. 1 is a schematic diagram of a known SDRAM.

One type of known memory device is the synchronous dynamic random access memory (SDRAM). A typical example of an SDRAM is shown in FIG. 1. The SDRAM 2 comprises two memory banks 4a and 4b. In some known SDRAMs, four memory banks are in fact provided. Each memory bank 4a and 4b contains a plurality of rows R which are sometimes referred to as pages. Each memory bank 4a and 4b also contains a plurality of columns C which intersect the rows R. A memory location is therefore identified by the bank number, the row number and the column number. To access a given memory location (or word) a memory interface unit 6 is provided. The memory interface unit 6 receives an input 7 which provides the address of the word to be accessed. The address identifies the memory bank, row and column of the word to be accessed.

Based on the address input to the memory interface unit 6, control signals 12 are generated which are output to a respective column control unit 8 and to a respective row control unit 10. Each bank 4a and 4b has its own row and column control units 8 and 10. The row and column control units 8 and 10 are sometimes referred to as row and column decoders respectively. The row control unit 10 will, in accordance with the address input to the memory interface unit, select a row R in the selected memory bank 4a or 4b. Once the row R or page has been selected (or opened), then the appropriate column C is selected by the column control unit 8, again in accordance with the input address.

The operation to open a page or row R will generally take several cycles. Once a page or row R has been opened, any word in that page or row R can be selected in one cycle. Thus a first word at a first column C location can be accessed in one cycle and a different word in that same row R but in a different column C location can be accessed in the next cycle. Once all the required accesses in a given row R or page have been completed, the open page or row R needs to be closed. This is achieved by the row control unit 10 precharging all the rows R including the selected row in the selected memory bank 4a or 4b to a given voltage. This closing operation must be completed before another page or row in the same bank can be selected or opened. This closing operation also takes several cycles.

Figure 2:
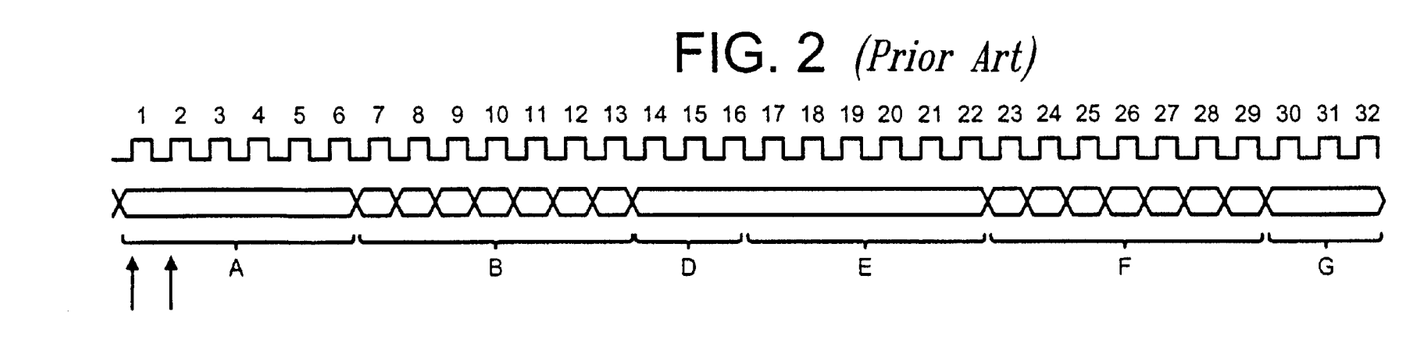
FIG. 2 illustrates the timing of the SDRAM of FIG. 1.

Reference will now be made to FIG. 2 which shows a sequence of steps which occurs when eight words from a first selected row R in a first memory bank 4a are read and then eight words from a second selected row in the second memory bank 4b are read. As can be seen, the first six cycles A are used to open the first selected row R and read the first required word in that row of the first memory bank 4a. The next seven cycles B are used to read the remaining required seven words in the opened row R. The next three cycles D are required to close the first selected row R in the first bank 4a. The next six cycles E are used to open the second selected row R in the second memory bank 4b and read the first required word from that row. The next seven cycles F are required to read the other seven required words in the second selected row. The last three cycles G are required to close the second selected row R in the second memory bank 4b. Thus, in order to read eight words from a given row in a memory bank requires 16 cycles even though the reading operation itself only requires 8 cycles. This therefore reduces the efficiency of the memory device and increases the time required in order to complete read and write operations.

It is therefore an aim of embodiments of the present invention to reduce the number of cycles required to carry out an operation in respect of a memory having a plurality of memory regions.

SUMMARY OF THE INVENTION

According to one aspect of the present invention, there is provided a memory interface device for generating a plurality of commands for controlling a memory having first and second memory regions, only one of said memory regions being accessible at a time, each memory region comprising a plurality of rows, said device comprising: a buffer for storing a plurality of received memory requests for said memory, said memory request each including information as to the row to be accessed of said respective memory region, and said buffer arranged to provide a respective output for each memory request, each of said outputs indicating said row to be accessed for the respective memory request; a detector arranged to receive said plurality of outputs from said buffer and to detect a next different row in each of said memory regions to be subsequently selected, said detector providing an output signal indicative of said detected next different row of said memory regions; and a command provider for providing a sequence of commands in response to said received memory requests and said output signals provided by said detector for controlling said memory, said command sequence being arranged so that a row of one of the first and second memory regions is accessed while said detected next different row of the other of the first and second memory regions is being selected.

Thus, as it is possible for one memory region to be accessed whilst the other memory region is being selected or deselected, the number of cycles required to access a burst may be reduced as compared to the prior art described in relation to FIG. 1.

Preferably, the portion of the memory regions which is selected or deselected comprises a row. A row is sometimes referred to as a page in relation to certain memory devices. When a portion of the first or second memory regions is accessed, information may be read from the respective portion. Alternatively, when a portion of the first or second memory regions is accessed, the information is written into the respective portion.

A register for storing a plurality of access requests may be provided, said access requests each including information as to the portion to be accessed and the memory region. This information may comprise address information. The register means may comprise a first-in-first-out register or may be any other suitable buffer. A detector for detecting the portion which is next to be accessed in each of the memory means may be provided. The detector may be arranged to receive from the register information as to the next portion which is to be accessed in each memory region. The detecting means may receive from the register, address information in respect of each request stored in the memory means.

A comparer may be provided for comparing the portion of a memory region which is currently selected with a portion of the memory region which is next to be accessed and outputting a signal based on the comparison.

The command provider may be arranged to process received requests in a nonsequential manner if a later request specifies the same memory location of a given memory region as an earlier request with intervening requests for said given memory region being processed after said later request. In this way, if, for example, a given page is open, a later request for that same page can be processed before a request for a different page is located. This reduces the number of times that a memory page needs to be opened and closed, thus increasing the cycle time of adjacent channels as small as possible.

According to a second aspect of the present invention, there is provided a method for accessing a memory comprising a plurality of memory regions, said method comprising the steps of: selecting a row of a first one of said memory regions; subsequently selecting or deselecting a row of a second one of said memory regions; and while the row of the second one of the memory regions is being selected or deselected, the row of the first one of the memory regions is accessed.

BRIEF DESCRIPTION OF THE DRAWINGS

For a better understanding of the present invention and as to how the same may be carried into effect, reference will now be made by way of example to the accompanying drawings in which.

DETAILED DESCRIPTION OF THE INVENTION

Figure 3:
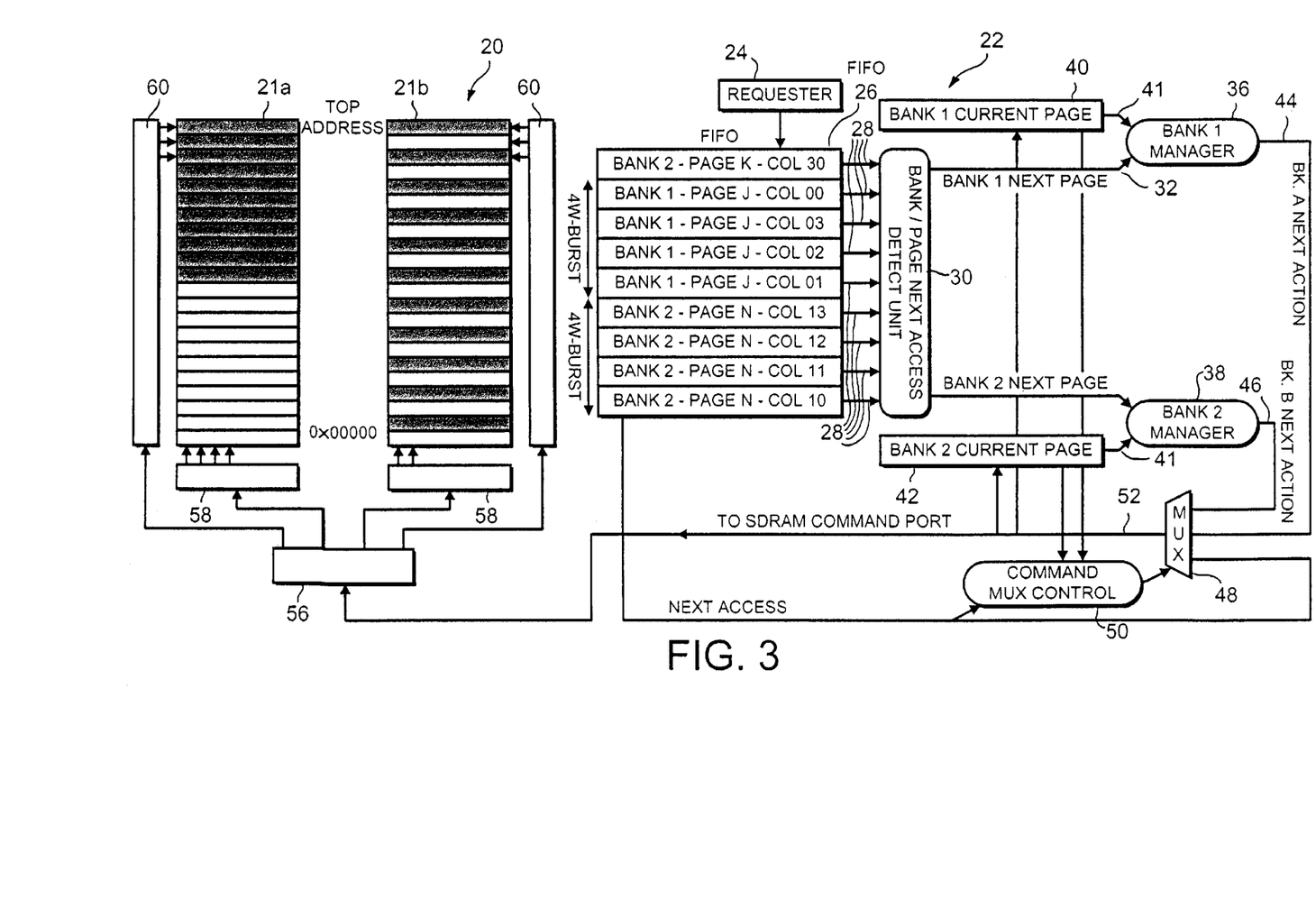
FIG. 3 is a SDRAM with circuitry embodying the present invention.

Reference will now be made to FIG. 3 which illustrates a memory interface 22 embodying the present invention with a SDRAM 20. The memory interface 22 controls the accessing of the SDRAM 20. As with the SDRAM shown in FIG. 1, the SDRAM 20 comprises a first and a second memory bank 21a and 22b. Each memory bank 21a and 21b has a plurality of rows and columns which define memory locations. Each memory bank 21a and 21b is also provided with a row control unit 60 and a column control unit 58, similar to those described in relation to FIG. 1.

The memory interface 22 comprises a requester 24 which generates or receives requests to access particular locations in the SDRAM 20. In practice the requester 24 is a computer processing unit (CPU). Each request will identify the memory bank of the SDRAM 20, the row (page) and the column which are to be accessed. The requests output from the requester 24 are input to a FIFO (first in first out) buffer 26 where they are stored in the order in which they are received. The requests are output by the FIFO 26 in the same order in which they are received.

Each location of the FIFO 26 which stores an address provides an output 28 to a detection circuit 30. In the example shown in FIG. 3, the FIFO 26 is able to store nine different requests and accordingly the FIFO has nine outputs 28 which are connected to the detection circuit 30. The detection circuit 30 is arranged to detect which row (page) in the first bank 21a of the SDRAM 20 is next to be accessed as well as the next page which is to be accessed in the second bank 21b of the SDRAM 20. In the embodiment illustrated in FIG. 3, page N is the next page to be accessed in the second bank 21b whilst page J is the next page to be accessed in the first bank 21a. The detect circuit 30 will generally be a combinatorial logic circuit but can take any other suitable form.

The detect circuit 30 provides two outputs 32 and 34. The first output 32 contains information as to the next page to be accessed in the first bank 21a. The second output 34 contains information as to the next page to be accessed in second bank 21b. The first and second outputs 32 and 34 of the detect circuit 30 are connected to respective bank managers 36 and 38. The first bank manager 36, which receives the first output 32 from the detect circuit 30 also receives a second input 41 from a memory or buffer 40 which stores the current page which is currently open or selected in the first bank 21a. The first bank manager 36 thus compares the page of the first bank 21a which is currently open with the next page of the first bank 2la which is to be accessed. The first bank manager 36 thus determines the next action for the first bank 21a. If the current page which is open and next page which is to be accessed are the same, first bank manager 36 will indicate that the next action for the first bank 21a will be the accessing of the required location on the open page or alternatively provide no output. If the current page which is open and the page which is next to be accessed are not the same, the first bank manager 36 will provide an output 44 which indicates that the next action for the first bank 21a will be to close the page which is currently open and then to open the page which is next to be accessed.

In some circumstances, there will be no page which is currently open. The first bank manager 36 will still output the next action which is required at the first bank 21a. In a preferred embodiment of the present invention the first bank manager 36 is arranged to output one action at a time. For example, the first bank manager 36 is arranged to provide an output which indicates that a page is to be closed. The first bank manager 36 is arranged to provide a subsequent output indicating which page in the first bank 21a is to be opened. This subsequent instruction may, but not necessarily, be provided when the previous instruction has been completed or is likely to be completed shortly. In one embodiment of the present invention each instruction from the first bank manager 36 is output once. In other embodiments of the present invention, each instruction is output until that instruction is acknowledged.

The second bank manager 38 operates in a similar manner to the first bank manager 36. In particular, the second bank manager 38 receives the second output 34 from the detect circuit and an output 41 from a second memory 42 which stores information as to the page which is currently open in the second bank 21b. As with the first bank manager 36, the second bank manager 38 provides an output 46 which determines the next action for the second bank 21b.

The two outputs 44 and 46 from the first and second bank managers 36 and 38 are input to a multiplexer 48 along with the next request which has the next address which is to be accessed. The next request which is to be accessed is output from the FIFO 26 to the multiplexer 48. This next request is the oldest request stored in the FIFO 26. The operation of the multiplexer 48 is controlled by a multiplexer controller 50 which arbitrates between the outputs 44 and 46 of the first and second bank managers 36 and 38 and the request output from the FIFO 26. The multiplexer controller 50 receives an input from the FIFO 26 which provides the next request, an input from the first memory 40 as to which, if any, page is open in the first bank 21a and an input from the second memory 42 as to which, if any, page is currently open in the second bank 21b. Based on this information, the multiplexer controller 50 decides what action should be carried out in the next clock cycle and controls the multiplexer 48. Effectively the multiplexer controller 50 acts as an arbiter and provides a series of commands. Usually, but not necessarily, one command may be provided per clock cycle. An open or close page command may take priority over a read command so that one bank may have a page being opened/closed whilst the other bank is being read. However some commands may include the open and/or close page instruction within a single command with the read/write instructions. In other words, the multiplexer 48 provides a suitable multiplexed output of commands so that, for example, reading of one bank may take place whilst the other bank has a row which is being opened or closed.

The output of the multiplexer 48 is input to a memory logic device 56. The output of the multiplexer 48 constitutes the outputs of the memory interface 22. Based on the input, the memory logic device 56 will cause a row to be opened or closed or a location to be accessed (read or written to). The memory logic device 56 controls the row and column control units 58 and 60 in accordance with the output from the memory interface 22. The location can either be read or written to. The memory logic 56 acts as a command decoder and also generates the control logic.

Because of the detect circuit 30, it is possible to ensure that a row in one bank can be opened or closed at the same time that a row in the other bank is being read. This significantly reduces the number of cycles taken to complete operations. The column control units 58 control the accessing of columns of the respective banks. The row control units 60 control the selection and deselection of the rows of the first and second banks 21a and 21b.

The multiplexed output from the multiplexer 48 is received by the memory logic device 56. As discussed hereinbefore, the output of the multiplexer 48 consists of a series of commands which are achieved by the memory logic device 56.

Figure 4:
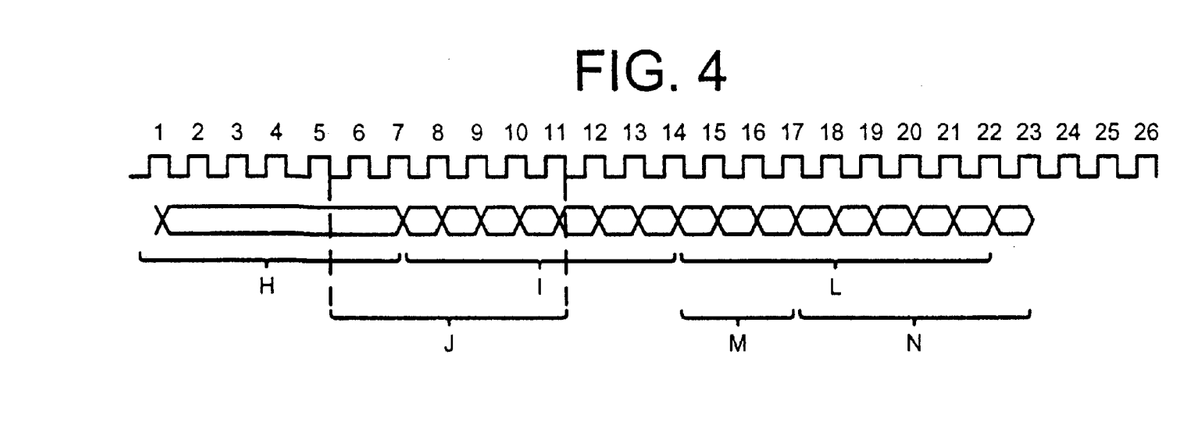
FIG. 4 illustrates the timing of the embodiment shown in FIG. 3.

Reference is made to FIG. 4 which shows an example of the timing where two eight word bursts are accessed. Each burst comprises eight words which are located in the same row of the same memory bank. Each burst may be accessed by a single command. The single command may also include the close page instructions. The first and second bursts are located in different banks. For the purposes of illustration, it will be assumed that the first burst requires access to the first bank 21a and the second burst requires access to the second bank 21b. The first six cycles H are required in order to open the required page in the first memory bank 21a for the first word in the first burst. The first word and the first burst are also accessed at the same time. In the next seven cycles I, the remaining seven words of the first burst are accessed. At the same time that the row in the first bank 21a is being opened and subsequently read, the required row in the second bank 21b is also being opened, for example during the five cycles marked J.

Accordingly, when the first burst has been completely been accessed, the required row of the second bank 21b can be immediately accessed in order to access the eight words of the second burst, this occurring in the eight cycles marked L. At the same that the second burst is being accessed, the row of the first bank 21a from which the first word was accessed can be closed in the three cycles marked M. In the six cycles marked N, which occur at the same time as five of the cycles marked L in which the words of the second burst are read, the next required row in the first memory bank 21a is opened and the first word of a third burst is read.

Thus, the first two eight word bursts can be read in 21 cycles. This compares favourably with the 29 cycles required with the known SDRAM described in relation to FIG. 1. Additionally, any subsequent burst in this mode will only require eight cycles. With the conventional SDRAM described in relation to FIG. 1, any subsequent burst requires 16 cycles.

In preferred embodiments of the present invention, the two banks cannot be read from or written to at the same time. However reading or writing in one bank can take place at the same time that the other bank is having a page opened or closed.

Figure 5:
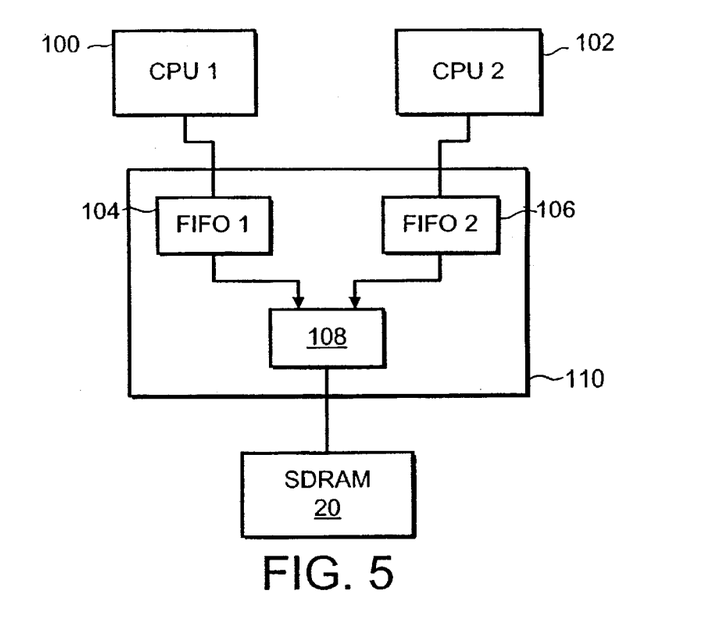
FIG. 5 illustrates a modified version of the circuitry shown in FIG. 2.

Reference is made to FIG. 5 which shows a modified version of the present invention. Two requesters 100 and 102 in the form of CPU1 and CPU2 are provided. The requests from the requesters 100 and 102 are input into respective first and second FIFO buffers 104 and 106. These FIFO buffers are the same as FIFO 26 of FIG. 3. The output of the first and second FIFO buffers 104 and 106 are input to a common unit 108 which includes the remaining circuitry of the memory interface unit 22 of FIG. 3. The bank defect circuit (not shown), will thus look at the contents of both the first and second FIFOs 104 and 106 but will otherwise operate in a similar manner to that of FIG. 3. The first and second FIFOs 104 and 106 and the common unit 108 define a memory interface unit 110. The output of the common unit is input to the memory logic for a SDRAM 20.

In preferred embodiments of the present invention, a different format is used for addressing the SDRAM. In typical SDRAMs the address is defined by bank, row and column, with the bank part being the most important part of the address and the column being the least important part of the address. In other words, one bank will have locations 0 to n−1 whilst the second bank will have locations n to 2n−1. However, in preferred embodiments of the present invention, an address format of row, bank and column is used with the row being the most important part of the address. In other words, the first row of the first bank will contain addresses 0 to M−1 (where M is the number of columns) and the first row of the second bank will have address locations M to 2M−1. The next rows in the first and second banks will have the locations 2M to 4M−1 and so on. This means that when data is being written into the memory, the two banks are more likely to be equally used so that the advantages of embodiments of the present invention can be achieved.

The input may be arranged to receive an input from a requester which may be in the form of a computer processing unit. In a preferred embodiment of the present invention, the input is arranged to receive an input from a plurality of requesters. It is preferred that a respective register be provided for storing the requests from each requester.

It should be appreciated that whilst embodiments of the present invention have been described in relation to an SDRAM, an embodiment of the present invention is applicable to any other type of memory which has two separate banks or regions which cannot be accessed at the same time. Embodiments of the present invention can be used with, for example, other types of DRAM.

In the embodiment described hereinbefore, two banks are shown. However, it should be appreciated that any other suitable number of banks may be provided, for example four.

In the illustrated embodiment, the FIFO 26 can have any suitable number of locations.

In one modification to the embodiment of the present invention, the detect circuit 30 may be arranged to check that the FIFO 26 does not contain any more requests for an open page before closing that page. This may involve reordering of the requests and accordingly additional storage capacity may be required in order to ensure that the information read out of the memory banks is ultimately output in the same order in which the requests are made. The additional memory may be required to receive the output of the memory banks.

The SDRAM 20 itself may be of any suitable conventional design or may be specially modified to be used with the accessing device 22. Any other suitable memory device may be used with embodiments of the present invention.

In such systems as described hereinbefore which use integrated circuits, one of the areas which restricts the overall system performance is the rate of data transfer between the memory device and the internal bus of an operational circuit which accesses that memory. A number of memory devices have been recently introduced which have improved data transfer rates in comparison to conventional memory devices. For example, conventional SDRAM (synchronous dynamic random access memory) typically has a data transfer rate of 32 bits at 100 MHz. An improvement to this is double data rate (DDR) SDRAM which is capable of transferring double the data rate than a conventional SDRAM and hence has a data transfer rate of 32 bits at 200 MHz. There are also available memory devices known as Direct Rambus memories (RDRAM Rambus Dynamic Random Access Memory) which have a transfer rate of 16 bits at 800 MHz. 'Rambus' and 'Direct Rambus' are trade marks of Rambus Inc.

Figure 6:
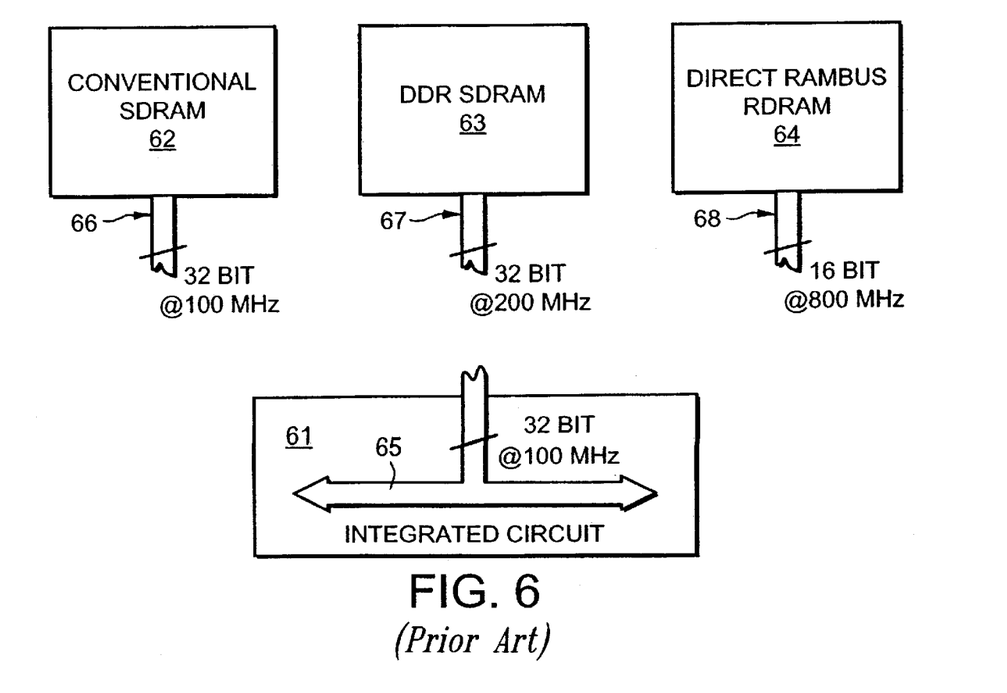
FIG. 6 schematically shows a conventional integrated circuit device and three data storage devices to which the integrated circuit device may be connected.

Presently conventional integrated circuits typically have an internal system bus with a data transfer rate of 32 bits at 100 MHz. FIG. 6 schematically illustrates a conventional integrated circuit 61 with an internal system bus 65 and three known memory devices, a conventional SDRAM 62, a double data rate SDRAM 63 and a Direct Rambus memory 64. (In practice only one of the three memory devices is provided). Each of the memory devices 62, 63 and 64 has an output bus which in use is coupled to the internal system bus 65 of the integrated circuit. The output bus 66 of the conventional SDRAM 62 has a data transfer rate of 32 bits at 100 MHz and is therefore entirely compatible with the internal bus 65 of the integrated circuit 61, which as shown, also has a data transfer rate of 32 bits at 100 MHz. However, the output bus 67 of the DDR SDRAM 63 has a data transfer rate of 32 bits at 200 MHz and the output bus 68 of the Direct Rambus memory 64 has a data transfer rate of 16 bits at 800 MHz. Accordingly the output buses 67 and 68 of the DDR SDRAM 63 and the Direct Rambus memory 64 are not compatible with the internal system bus 65 of the integrated circuit 61 in terms of data rate. Accordingly, with the existing conventional internal bus system of the integrated circuit, the higher data transfer rate of the DDR SDRAM and the Direct Rambus cannot be readily used.

Figure 7:
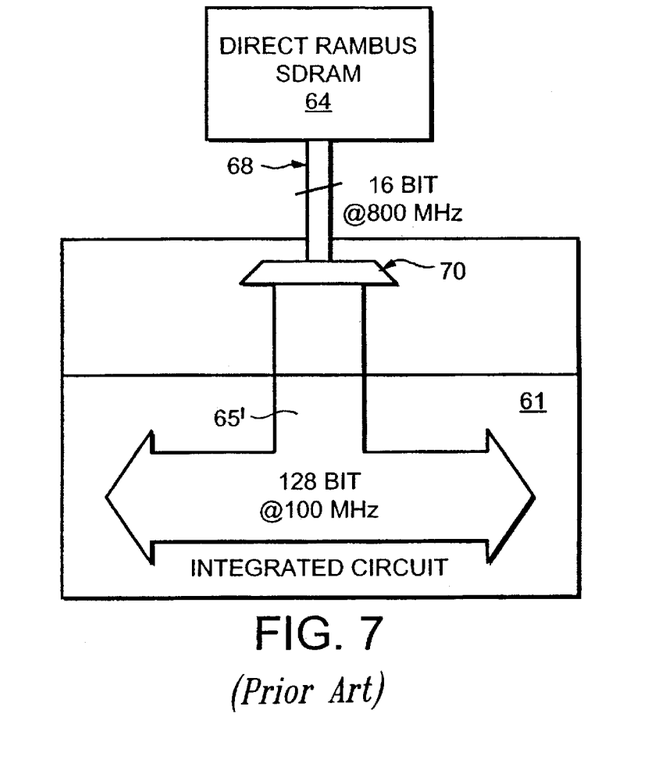
FIG. 7 shows an arrangement for connecting a Direct Rambus memory to a conventional integrated circuit.

To exploit the increased transfer rate of the faster memory devices, the width of the internal bus of the operational integrated circuit could be increased. For example, for a Direct Rambus memory with a transfer rate of 16 bits at 800 MHz, the internal bus of the operational integrated circuit would have to be increased to a 128 bit bus operating at 100 MHz. As this is four times the present conventional bus width the resulting integrated circuit would be much more complex and require increased effort in designing the layout of the interconnects within the integrated circuit and would also consume a much larger area of silicon. This is disadvantageous. FIG. 7 illustrates an example of a Direct Rambus 64 connected to an integrated circuit 61, the integrated circuit having an internal system bus 65 with a transfer rate of 128 bits at 100 MHz. At the interface between the Direct Rambus memory 64 and the integrated circuit 61, a demultiplexer 70 would be required to spread the short 16 bit words from the Direct Rambus onto the 128 bit wide internal bus of the integrated circuit. The addition of a demultiplexer 70 further increases the complexity and required silicon area of the integrated circuit.

The speed of the internal bus of the integrated circuit could be increased to match that of the memory device connected to it. However, this would require redesigning the integrated circuit and in practice, the internal buses of integrated circuits which represent the current state of the art already typically operate at a speed close to the current maximum possible speed.

It would therefore be desirable to provide an improved interface between data storage devices with a relatively high data transfer rate and the internal bus system of an integrated circuit operating with a relatively low data transfer which overcomes or at least mitigates against the problems described hereinbefore.

As described hereinbefore with reference to FIG. 2, in a conventional SDRAM, to retrieve 8 words of data, it takes 3 clock cycles to close a previous page, 6 cycles to open the next page and retrieve the first-word of data and a further 7 clock cycles to transfer the requested data from the memory. In a Direct Rambus memory device, the delay necessary to close a page and open a subsequent page is 9 cycles and the time taken to transfer the remaining data from the memory is a further 1 cycle.

Figure 8:
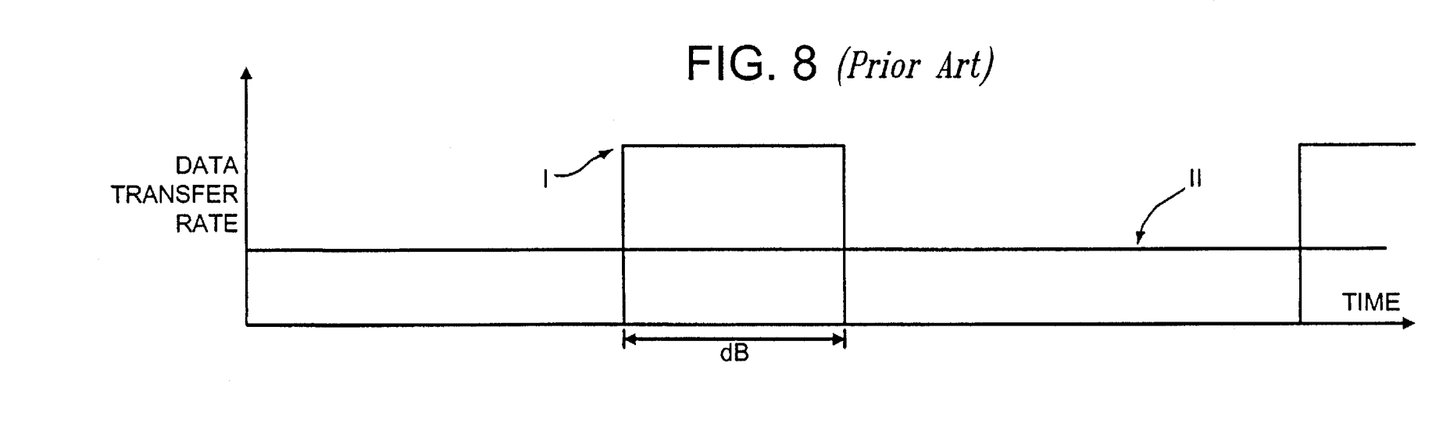
FIG. 8 shows instantaneous and average data transfer rates for a Direct Rambus memory.

Because of the delay required to close and open pages, the instantaneous data transfer from the memory device is not constant. FIG. 8 shows the variation of instantaneous data transfer from a Direct Rambus device with respect to time. The instantaneous data transfer rate is shown by the line I and it can be seen that the memory only in fact outputs data at a high transfer rate for short periods of time or bursts. One such period is referenced db in FIG. 8. The average data transfer rate over a longer period of time is shown by line II and is much lower than the peak data transfer rate of the memory device.

As stated hereinbefore, a Direct Rambus memory device requires a total of 10 cycles to output data from the memory which has been requested by the integrated circuit (3 cycles to close a page and 6 cycles to open a new page and retrieve the first data word and 1 cycle to retrieve the remaining data words). As the transfer rate of a Direct Rambus memory device is 16 bits at 800 MHz, the average rate of data transfer is 320 M bytes per second. An internal bus of an integrated circuit operating at 32 bits at 100 MHz is capable of sustaining a data transfer rate of 400 M bytes per second.

Figure 9:
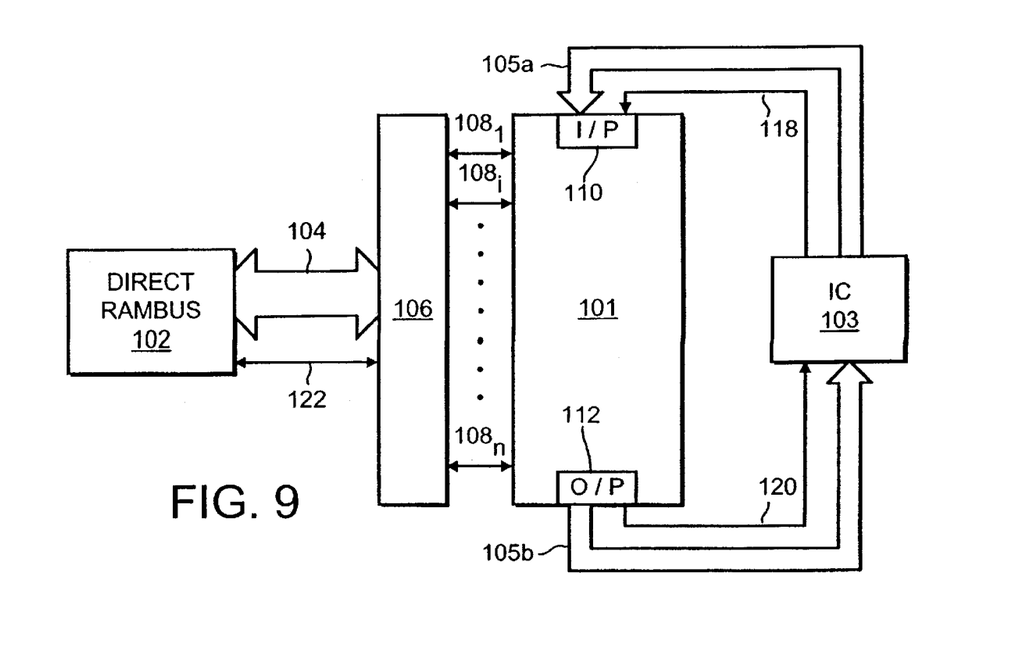
FIG. 9 shows a Direct Rambus connected to an integrated circuit via an interface.

Reference is now made to FIG. 9 which shows a Direct Rambus 102 connected to an integrated circuit 103 via an interface 101, 106. To take advantage of the higher average data transfer rate of a conventional internal bus of a integrated circuit in comparison to the average data transfer rate of a Direct Rambus memory device, the interface 101, 106 is provided between the Direct Rambus 102 and the integrated circuit 103. This interface 101, 106 is capable of smoothing out the peaks in the instantaneous data transfer rate of the Direct Rambus and providing an output to the internal bus of the integrated circuit 103 which operates at least at the average data transfer rate of the Direct Rambus 102. It is preferred that the average data transfer rate of the Direct Rambus 102 be the same as the internal bus of the integrated circuit 103.

In FIG. 9, the Direct Rambus memory device 102 is connected to the internal bus of integrated circuit 103 via the interface 101, 106 which consists of a buffer 101 and a controller 106. Connected between the Direct Rambus 102 and the integrated circuit 103 is the buffer 101 and the interface controller 106. The controller 106 may comprise, but not necessarily, the memory interface 22 as described in FIG. 3, with buffer 101 replacing FIFO 26 and integrated 103 replacing the requestor 26. The buffer 101 has an input 110 and an output 112. Connected between the input 110 of the buffer 101 and the integrated circuit 103 is a first data bus 105a which has a transfer rate equal to that of the internal bus of the integrated circuit 103, i.e., 32 bits at 100 MHz. Also connected between the input 110 of the buffer 101 and the integrated circuit 103 is a first control line 118. Connected from the output 112 of the buffer 101 to the integrated circuit 103 is a second data bus 105b which has a transfer rate equal to the first data bus 105a. It will be appreciated that first and second data buses 105a and 105b in fact comprise the same data bus and are shown separately in FIG. 9 merely for the sake of convenience. Also connected between the output 112 of the buffer 101 and the integrated circuit 103 is a second control line 120.

Connected between the Direct Rambus 102 and the interface controller 106 is a third data bus 104. The third data bus 104 has a data transfer rate of 128 bits at 100 MHz which is equal to the peak instantaneous data transfer rate of the Direct Rambus. Also connected between the Direct Rambus 102 and the interface controller 106 is a third Direct Rambus control line 122. The interface controller 106 is connected to the buffer 101 by an interface bus 108. The interface bus 108 comprises a plurality of individual data transfer lines $108_1$, $108i$, $108n$. There are n data transfer lines provided where n is the number of storage locations within buffer 101.

The operation of the circuit shown in FIG. 9 will now be described. Beginning from the initial conditions of the buffer 101 being empty and the Direct Rambus 102 having all its pages closed, the integrated circuit 103 loads a memory request, MEM-REQ, into the buffer 110 via the first data bus 105a. The memory request M-REQ may be a request to access (read) data stored in the Direct Rambus memory 102 or it may be a request to write data to the Direct Rambus memory 102. If the memory request is a request to write data to the Direct Rambus memory 102, the data to be written is also loaded into the buffer 101 via the data bus 105a. Control signals for controlling the operation of the buffer 101 are also output from the integrated circuit 103 via the first control line 118.

The interface controller 106 scans the storage locations of the buffer 101 in turn, starting from the nth data storage location and when a data storage location is scanned which contains a memory request the memory request is output from the buffer 101 via the corresponding data transfer line to the interface controller 106. The interface controller 106 scans a number of data storage locations within buffer 101 and multiplexes the memory request signals and any corresponding data onto the third data bus 104 such that the memory requests are input to the Direct Rambus 102. The Direct Rambus 102 now begins the action of opening a page in the memory array in order to supply the requested data or to write the supplied data in the relevant memory location. As previously discussed, there is a delay of 6 cycles while the page is opened before any data can be output from the Direct Rambus 102. During this delay, the integrated circuit 103 may be outputting further memory requests to the buffer 101. These further memory requests are stored in the buffer 101 during the delay period which occurs while the Direct Rambus 102 is opening the page associated with the first memory request.

When the Direct Rambus 102 has opened the page associated with the first memory request, if that memory request is a request to access data from the Direct Rambus, the requested data is then transferred from the Direct Rambus 102 via the third data bus 104 to the interface controller 106. Control signals associated with controlling the input and output from the Direct Rambus 102 are passed between the Direct Rambus 102 and the interface controller 106 by the third control line 122. The interface controller 106 demultiplexes the data received from the Direct Rambus 102 and inputs it via data transfer lines $108i$ to empty data storage locations within buffer 101. The interface controller 106 then scans the data storage locations within the buffer 101 for the next memory requests which are to be served. The data accessed from the Direct Rambus 102 in response to a memory request received from the integrated circuit 103 via the interface controller 106 and buffer 101, is passed through the buffer 101 and output at output 112 to the integrated circuit 103 via the second data bus 105b, together with associated control signals via the second control line 120.

The buffer 101 serves two functions. Firstly, it is able to buffer the memory requests from the integrated circuit 103 to the Direct Rambus 102, allowing the integrated circuit to output a number of memory requests without having to wait for each of those requests to be served by the Direct Rambus 102 before outputting subsequent requests. Secondly, the buffer 101 is able to buffer the data supplied from the Direct Rambus 102 before it is transmitted to the integrated circuit 103. Preferably, the buffer 101 should always have space available to store the accessed data from the Direct Rambus 102 thus enabling the Direct Rambus 102 to always output data at its maximum speed of 16 bits at 800 MHz.

To calculate the required size of the buffer it is assumed that the integrated circuit 103 will output ICY consecutive memory requests. The Direct Rambus 102 will see these as MemY accesses, as MemY=ICY (integrated circuit internal bus width÷Direct Rambus internal bus width). It is assumed that all of the memory requests are in the same page in the Direct Rambus 102. The Direct Rambus 102 can process MemY−1 memory requests in MemY−1 cycles. During the same time, the integrated circuit 103 can issue X memory requests, where $X$=MemY−1 (Direct Rambus bus width÷ic bus width)

Approximating MemY−1 to MemY we have buffer size (in memory word units)
=MemY−X
=MemY (1− (icclk×1cwd))/(memclk memwd))
where iclk=integrated circuit clock speed, mem clk=Direct Rambus clock speed, icwd=integrated circuit internal bus width, and memwd =Direct Rambus internal bus width.

Figure 10:
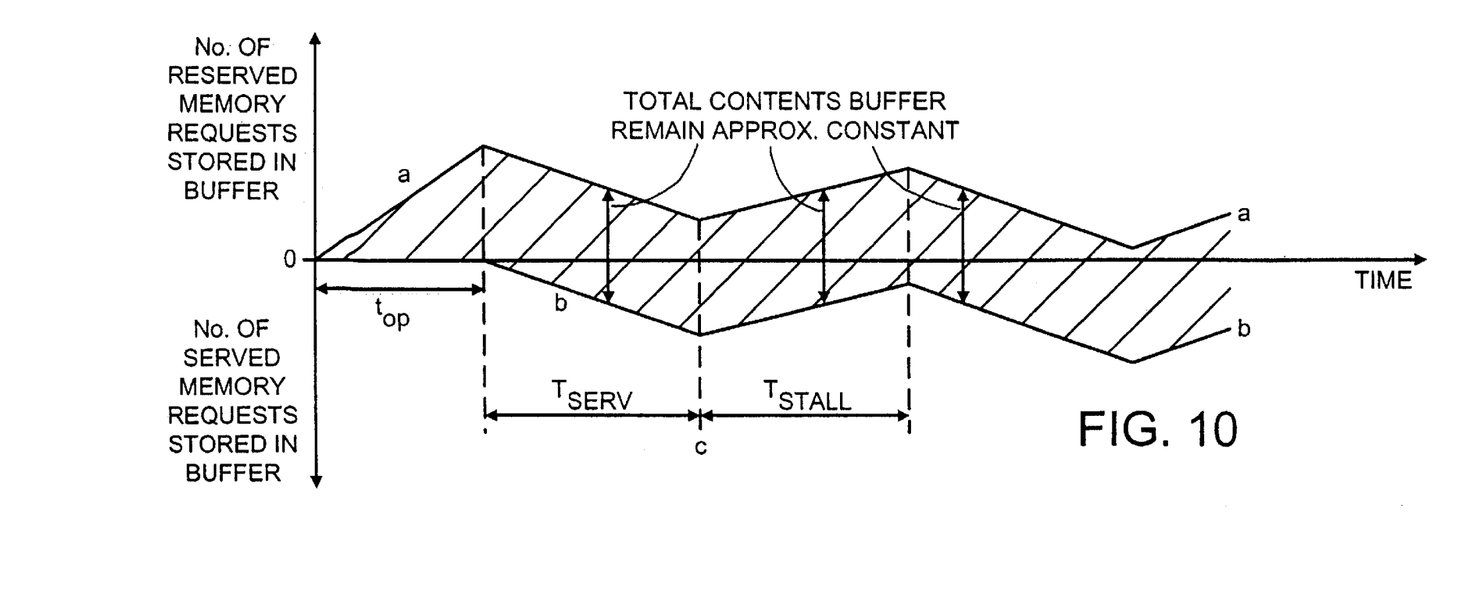
FIG. 10 schematically illustrates how the contents of the interface of FIG. 5 vary with time.

FIG. 10 demonstrates the behaviour of the buffer when the size of the buffer has been correctly chosen. Line A represents the number of memory requests stored in the buffer which are yet to be processed by the memory and line B represents the number of memory requests which have been processed by the memory with the associated data being stored in the buffer. The distance between lines A and B represents the total amount of data stored in the buffer. Initially line A rises sharply over the time period $t_{op}$ as the buffer stores an increasing number of memory requests from the integrated circuit. This initial sharp rise occurs during the delay caused by the memory opening the required page of the first memory request. Once the required page has been opened, the memory is able to output the requested data to the buffer and begin to process the next memory request stored in the buffer. If subsequent memory requests require the same page which is currently open, a number of bursts of requested data may be output to the buffer. This line A begins to fall as the number of memory requests in the buffer falls, and line B begins to fall, representing an increase in the amount of data stored in the buffer. This is indicated on FIG. 6 by the period $t_{serv}$.

At a subsequent point in time, point c, it will be necessary to close the currently open page and open a new page in the memory, causing the delay in outputting data from the memory as previously discussed. The memory is said, at this point, to be 'stalled'. Whilst the memory is stalled lines A and B rise again as the number of memory requests stored in the buffer once again rises and the amount of data stored in the buffer from the memory decreases. This is shown by the period $t_{stall}$. This action continues over time with lines A and B rising and falling together. It can be seen that the distance between lines A and B which represents the total amount of data contained within the buffer remains approximately constant.

The circuitry described hereinbefore operates particularly advantageously when memory requests are issued by the integrated circuit 103 in short bursts. When this occurs data stored in the buffer in response to memory requests can always be output to the integrated circuit 103 at the same time that the Direct Rambus 102 is stalled during the opening of a further page in the memory. If the number of memory requests issued by the integrated circuit 103 at any one time is too large then when those requests are served by the Direct Rambus 102 the average rate of data transfer will increase to a value which is in excess of the transfer rate of the internal bus within the integrated circuit 103 and the Direct Rambus 102 will be forced to wait for previously served memory requests to be delivered to the integrated circuit before the Direct Rambus can output any further data. However, this occasional loss in performance may not be fatal to the operation of the integrated circuit, it will be more cost effective in terms of design effort and silicon area consumed to use the buffering arrangement of embodiments of the present invention.

Figure 11:
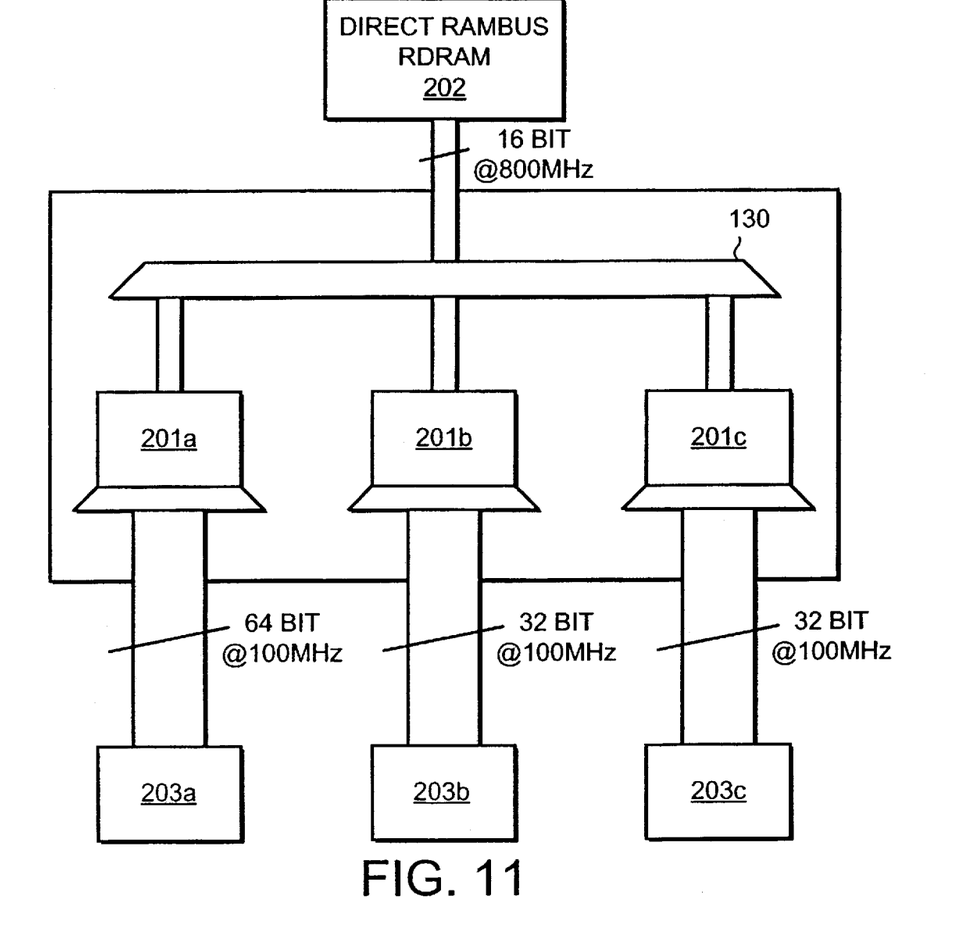
FIG. 11 shows a Direct Rambus connected to a number of integrated circuits via a number of interfaces of the type shown in FIG. 9.

A further example of improved interface described hereinbefore is shown in FIG. 11. In this example a number of buffers 201a, 201b, 201c are connected via a demultiplexer 130 to the output of a Direct Rambus 202. Each of the buffers 201a, 201b and 201c are of the same type as the buffer 101 shown in FIG. 9 and described hereinbefore. Each of the integrated circuits is of the same type as integrated circuit 103 shown in FIG. 9. Each buffer is connected to the internal bus of an integrated circuit 203a, 203b, 203c, each of the internal buses having a lower peak data transfer rate than that of the Direct Rambus 202. Each of the integrated circuits may have a different function from each other and may thus make different memory requests to the Direct Rambus 202 at different times. The Direct Rambus 202 provides the data in response to these requests and outputs the data to the multiplexer 130 which is arranged to route the data to whichever of the buffers 201a, 201b or 201c issued the memory requests. In this example, by providing a number of buffers connected to the Direct Rambus 202 a higher maximum average data transfer rate from the Direct Rambus can be achieved as the data output from the memory is stored in a number of different buffers. If, as shown, the number of buffers provided is 3, then this allows 3 times the maximum average data transfer rate from the Direct Rambus before the Direct Rambus is forced to wait for the slower internal buses of the integrated circuit to retrieve the stored memory data from the relevant buffers.

It should be appreciated that in embodiments of the present invention, it is not necessary that when one memory region is being accessed that the other memory region have a portion thereof being selected or deselected. Rather, embodiments of the present invention are particularly applicable to situations where the instructions occur in an order such that it is possible that one memory region can be accessed whilst a portion of the other memory region is being selected or deselected.

What is claimed is:

1. A memory interface device for generating a plurality of commands for controlling a memory having first and second memory regions, only one of said memory regions being accessible at a time, each memory region comprising a plurality of rows, said device comprising:

a buffer for storing a plurality of received memory requests for said memory, said memory requests each including information as to the row to be accessed of said respective memory region, and said buffer arranged to provide a respective output for each memory request, each of said outputs indicating said row to be accessed for the respective memory request;

a detector arranged to receive said plurality of outputs from said buffer and to detect a next different row in each of said memory regions to be subsequently selected, said detector providing an output signal indicative of said detected next different row for each of said memory regions; and a command provider for providing a sequence of commands in response to said received memory requests and said output signals provided by said detector for controlling said memory, said command sequence being arranged so that a row of one of the first and second memory regions is accessed while said detected next different row of the other of the first and second memory regions is being selected.

2. A device as claimed in claim 1, wherein said detector receives at least two said outputs from said buffer, said at least two outputs corresponding to at least one of said memory regions.

3. A device as claimed in claim 1, wherein said outputs provided from said buffer are equal in number to said plurality of memory requests stored in said buffer.

4. A device as claimed in claim 1, wherein when said row of the first or the second memory regions is accessed, infonnation is read from said row.

5. A device as claimed in claim 1, wherein when said row of the first or second memory regions is accessed, information is written into said row.

6. A device as claimed in claim 1, wherein said buffer comprises a first in first out register.

7. A device as claimed in claim 6, wherein said register also stores data from said memory, said register comprising output means for outputting request signals and said stored data from the memory to a requesting device.

8. A device as claimed in claim 7, wherein said requesting device is an operational circuit.

9. A device as claimed in claim 8, wherein a first data bus is provided between the operational circuit and the register and a second data bus is provided between the memory interface device and the memory, the maximum data transfer rate of the first bus being different to that of the second bus.

10. A device as claimed in claim 1, wherein a comparer is provided for comparing the row of a memory region which is currently selected with the row of that memory region which is next to be accessed and outputting a signal based on said comparison.

11. A device as claimed in claim 10, wherein a respective comparer is provided for each memory region.

12. A device as claimed in claim 1, wherein an output is provided for outputting said commands to said memory.

13. A device as claimed in claim 1, wherein said buffer is arranged to receive said memory requests from a requester.

14. A device as claimed in claim 13, wherein said requester is a computer processing unit.

15. A device as claimed in claim 13, wherein said buffer is arranged to receive said memory requests from a plurality of requesters.

16. A device as claimed in claim 15, wherein a respective register is provided for storing requests for each requester.

17. A device as claimed in claim 1, wherein said command provider is arranged to process received requests in a nonsequential manner if a later request specifies the same memory location of a given memory region as an earlier request, with intervening requests for said given memory region being processed after said later request.

18. In combination, a device as claimed in claim 1 and a memory comprising a plurality of memory regions.

19. A combination as claimed in claim 18, wherein said memory is a dynamic random access memory.

20. A combination as claimed in claim 18, wherein said memory comprises a synchronous dynamic random access memory.

21. A device as claimed in claim 13, wherein said memory regions are arranged so that row n of the first memory region contains address x to x+y where y+1 is the number of locations in said row and row n of the second memory region contains address x+y+1 to x+2y+1.

22. A method for accessing a memory comprising a plurality of memory regions, said method comprising the steps of:

selecting a row of a first one of said memory regions;

subsequently selecting or deselecting a row of a second one of said memory regions; and while the row of the second one of the memory regions is being selected or deselected, the row of the first one of the memory regions is accessed.

* * * * *